Patented Jan. 31, 1933

1,895,545

UNITED STATES PATENT OFFICE

ERNST HUG AND HEINRICH WERDENBERG, OF NEU-ALLSCHWIL NEAR BASEL, SWITZERLAND, ASSIGNORS TO THE FIRM OF "DURAND & HUGUENIN, S. A.," OF BASEL, SWITZERLAND

GALLOCYANINE DYESTUFF

No Drawing. Application filed November 20, 1928, Serial No. 320,746, and in Germany November 26, 1927.

The present invention relates to new dyestuffs of the gallocyanine series, more particularly to dyestuffs of the probable general formula:

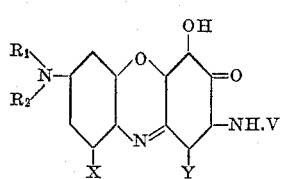

wherein X stands for halogen or alkyl such as for instance alkyl or halogen, $R_1$ for an alkyl group, $R_2$ for hydrogen or an alkyl group, Y for hydrogen, a carboxylic group, or a substituted carboxylic group such as $CONH_2$, CONH aryl, COO alkyl etc., and V represents a benzene or naphthalene nucleus which may be substituted.

In accordance with the invention the dyestuffs of the above formula are of high technical value in discharge printing in consequence of their good fastness to hydrosulphite and other reducing agents.

The method of their preparation consists f. i. in reacting upon a compound of the probable formula:

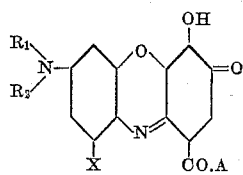

wherein A represents a hydroxy-, alkoxy-, amino- or arylamino group and the other litterae have the same meaning as above, with an aromatic amine, for instance according to the process described in the U. S. Patent No. 897,619. To obtain the final dyestuffs water-soluble the condensation products may be sulphonated, the sulpho group entering the aryl residue V, see formula on page 1. In some cases the group COA may be split off during the anilidation or sulphonation process. The thus obtained products are of especially high value for printing purposes in view of their good solubility.

The new products constitute dark powders, yielding when printed with chrome mordants reddish blue to greenish blue shades of satisfactory fastness to hydrosulphite under the conditions of discharge printing. The products containing sulpho groups are easily soluble in water with a blue coloration in form of their ammonium- or alkali metal salts.

Obviously, as usual in the gallocyanine series, also the leuco compounds of such products may be used for printing purposes, and it is to be understood, that also these leuco compounds are within the scope of our invention.

The following examples illustrate the invention, the parts being by weight:

Example 1

The gallocyanine dyestuff which is obtained from nitroso-dyethyl-meta-toluidine and gallic acid is stirred together with aniline for about 24 hours while leading air through the mass. The latter is then heated to 120–125° C. for about 6 hours, while always stirring, whereby splitting off of the carboxylic group occurs (see U. S. patent specification No. 936,247). The crystalline product which separates out after cooling is filtered off, washed with alcohol and dried.

The product thus obtained corresponds probably to the formula:

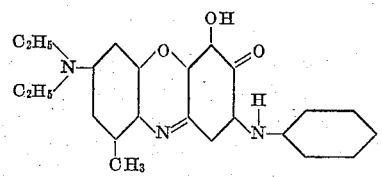

It forms a dark crystalline powder with metallic lustre which is difficultly soluble in the usual organic solvents and soluble in strong sulphuric acid with a violet coloration.

5 parts of this anilido compound are dissolved in 30 parts of fuming sulphuric acid of 20 per cent strength and the mixture is warmed to about 45° C., while stirring, until a sample is completely soluble in dilute alkali. When the melt is diluted with water, a compound separates out, which has probably the following formula:

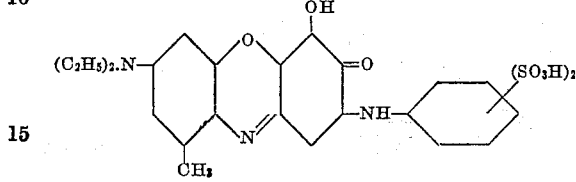

This body is filtered off, washed and transformed into a soluble alkali salt.

When printed on cotton with chrome mordants, it yields a bright greenish blue shade, which withstands hydrosulphite considerably better than that obtained with the corresponding dyestuff from nitroso-diethylaniline.

A similar product is obtained by treating the dyestuff from nitrosodiethyle-meta-toluidine and gallamide with aniline in the presence of dinitrobenzene according to the process described in U. S. patent specification No. 897,619 and by sulphonating the anilido compound thus formed by means of fuming sulphuric acid of 8 per cent $SO_3$ strength at about 90–95° C. The dyestuff is isolated by pouring into ice-water.

*Example 2*

60 parts of gallamide and 90 parts of nitrosodimethyl-meta-chloraniline hydrochloride in 500 parts of methyl alcohol are boiled in a reflux apparatus, until no more nitroso compound is present. Strictly in accordance with Example 1, this dyestuff is transformed into its anilido compound by condensation with aniline. The anilido compound dissolves in concentrated sulphuric acid with a red-violet coloration. By sulphonation, carried out in the usual way, a useful water-soluble dyestuff is produced.

This dyestuff yields, when printed on cotton with chrome mordants, shades which are more reddish than those obtained with the product according to Example 1. It also withstands hydrosulphite better than the corresponding dyestuff from nitroso-dimethylaniline.

*Example 3*

The gallocyanine dyestuff from nitrosomonoethyl-meta-toluidine and gallamide is transformed into the corresponding anilido compound and sulphonated as described in Example 1. When printed with chrome mordants the dyestuff thus obtained yields a bright blue shade, possessing a considerably higher resistance to hydrosulphite, as compared to the corresponding isomeric dyestuffs from nitrosomonoethyl-ortho-toluidine and gallamide. In the latter products, the methyl group is in ortho-position to the ethylamino group, while in the former new dyestuff the methyl group is in meta position to the ethylamino group.

In the above examples, aniline can be replaced by other aromatic amines, such as for instance toluidine, chloraniline, naphthylamine and the like.

*Example 4*

35 parts of the gallocyanine dyestuff obtained from nitroso-dimethyl-meta-toluidine with gallamide are treated at a temperature of 80° C. with 100 parts of diethyl-para-phenylenediamine and 10 parts of dinitrobenzene according to the process described in Example 1 of U. S. patent specification No. 844,156.

The melt is diluted with alcohol, whereby the condensation product separates out. The same is filtered off and transformed into the corresponding leuco compound, for instance by means of zinc and hydrochloric acid. When printed with chrome mordants the latter yields a blue shade similar to that of the product of Example 1 of U. S. patent specification No. 844,155, but being more resistant to hydrosulphite than the latter.

What we claim is:—

1. The herein described new gallocyanine dyestuffs, having in their free state the probable general formula:

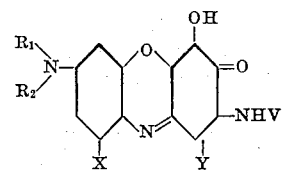

wherein X stands for alkyl or halogen, $R_1$ for an alkyl group, $R_2$ for hydrogen or an alkyl group, Y for hydrogen or a carboxyl group, which may be free or substituted by alkyl, $NH_2$ or NH-aryl, and V represents a benzene or naphthalene nucleus, which may be substituted by alkyl, halogen, free or alkylated $NH_2$—or sulpho groups, said products being valuable dyestuffs for discharge printing, yielding bright reddish blue to greenish blue shades and being also usable in form of their leuco derivatives.

2. The herein described new gallocyanine dyestuffs, having in their free state the probable general formula:

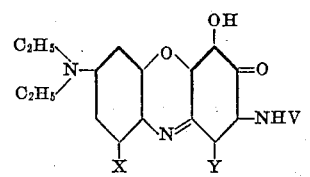

wherein X stands for alkyl or halogen, Y for hydrogen or a carboxyl group, which may be free or substituted by alkyl, $NH_2$ or NH-aryl and V represents a benzene or naphthalene nucleus, which may be substituted by alkyl, halogen, free or alkylated $NH_2$—or sulpho-groups, said products being valuable dye-stuffs for discharge printing, yielding bright reddish-blue to greenish-blue shades and being also usable in form of their leuco derivatives.

3. The herein described new gallocyanine dyestuffs, having in their free state the probable general formula:

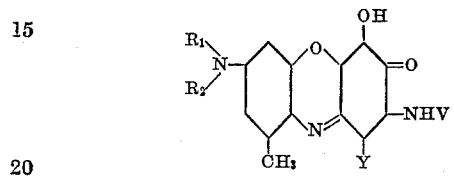

wherein $R_1$ stands for an alkyl group, $R_2$ for hydrogen or an alkyl group, Y for hydrogen or a carboxyl group, which may be free or substituted by alkyl, $NH_2$ or NH-aryl, and V represents a benzene or naphthalene nucleus, which may be substituted by alkyl, halogen, free or alkylated $NH_2$—or sulpho-groups, said products being valuable dye-stuffs for discharge printing, yielding bright reddish blue to greenish blue shades and being also usable in form of their leuco derivatives.

4. The herein described new gallocyanine dyestuff, obtained by converting the product resulting from nitroso-diethyl-meta-toluidine and gallic acid into its anilido compound and sulphonating the latter, said gallocyanine dyestuff corresponding probably in its free state to the formula:

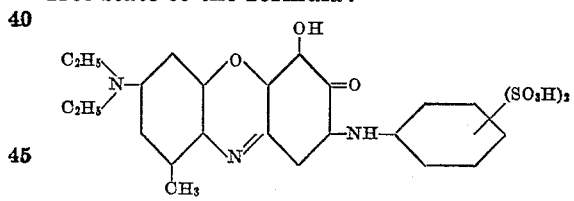

being valuable in discharge printing, yielding bright blue shades and being also usable in form of the leuco derivatives.

In witness whereof we have hereunto signed our names this 8th day of November, 1928.

ERNST HUG.
HEINRICH WERDENBERG.